US007813876B2

(12) United States Patent
Gasbarro et al.

(10) Patent No.: US 7,813,876 B2
(45) Date of Patent: *Oct. 12, 2010

(54) DISMOUNT TABLET COMPUTER ASSEMBLY FOR WIRELESS COMMUNICATION APPLICATIONS

(75) Inventors: Henry Frank Gasbarro, Marina del Ray, CA (US); Joseph Edwin Carpenter, Long Beach, CA (US); Robert R. Berry, Glendora, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1433 days.

This patent is subject to a terminal disclaimer.

(21) Appl. No.: 10/634,295

(22) Filed: Aug. 5, 2003

(65) Prior Publication Data

US 2005/0033513 A1    Feb. 10, 2005

(51) Int. Cl.
*G01C 21/00* (2006.01)
(52) U.S. Cl. .................. 701/213; 340/989; 455/457
(58) Field of Classification Search .................. 701/213, 701/300; 340/989, 991, 993; 455/404.2, 455/456.1, 456.6, 457
See application file for complete search history.

(56) References Cited

U.S. PATENT DOCUMENTS

| | | | |
|---|---|---|---|
| 5,548,822 A |  | 8/1996 | Yogo |
| 5,919,239 A |  | 7/1999 | Fraker et al. |
| 5,952,959 A | * | 9/1999 | Norris .................. 342/357.08 |
| 6,104,815 A |  | 8/2000 | Alcom et al. ................ 380/251 |
| 6,148,261 A | * | 11/2000 | Obradovich et al. ........ 701/208 |
| 6,278,402 B1 | * | 8/2001 | Pippin .................. 342/357.08 |
| 6,285,341 B1 | * | 9/2001 | Roscoe et al. ............... 343/895 |
| 6,466,453 B2 | * | 10/2002 | Kobayashi ................. 361/818 |
| 6,486,534 B1 | * | 11/2002 | Sridharan et al. ........... 257/659 |
| 6,492,941 B1 |  | 12/2002 | Beason et al. |

(Continued)

FOREIGN PATENT DOCUMENTS

DE        004228605 A1 *   3/1994

(Continued)

OTHER PUBLICATIONS

Microsoft, Use Power Schemes for the Tablet PC, "http://www.microsoft.com/windowsxp/using/tabletpc/learnmore/powerschemes.mspx", Nov. 7, 2002.*

(Continued)

*Primary Examiner*—Khoi Tran
*Assistant Examiner*—Brian J Broadhead
(74) *Attorney, Agent, or Firm*—Tarolli, Sundheim, Covell & Tummino LLP

(57) ABSTRACT

Systems and methods are disclosed for utilizing one or more tablet computer assemblies in a portable communications system. A tablet computer assembly includes a global positioning system module, an L-band transceiver, and a processing system. The global positioning system module that produces location information associated with the position of the tablet computer assembly. The L-band transceiver broadcasts the location information to at least one portable communication device through a relay network and receives location information from the at least one portable communications device via the relay network. The processing unit provides messages to the L-band transceiver and updates a display associated with the tablet computer assembly according the received location information and the location information produced at the global positioning system module.

17 Claims, 9 Drawing Sheets

U.S. PATENT DOCUMENTS

| | | | |
|---|---|---|---|
| 6,542,117 B1* | 4/2003 | Broughton | 342/359 |
| 6,639,800 B1* | 10/2003 | Eyman et al. | 361/704 |
| 6,860,641 B1* | 3/2005 | Goldenburg et al. | 385/53 |
| 6,866,544 B1* | 3/2005 | Casey et al. | 439/607 |
| 6,917,860 B1* | 7/2005 | Robinson et al. | 701/3 |
| 2002/0046259 A1 | 4/2002 | Glorikian | 709/218 |
| 2002/0055368 A1 | 5/2002 | Lee | 455/556.2 |
| 2002/0077123 A1* | 6/2002 | Otsuka et al. | 455/456 |
| 2002/0173909 A1* | 11/2002 | Verbil | 701/213 |
| 2003/0016143 A1* | 1/2003 | Ghazarian | 340/901 |
| 2003/0017646 A1* | 1/2003 | Sridharan et al. | 438/106 |
| 2003/0032426 A1* | 2/2003 | Gilbert et al. | 455/427 |
| 2003/0066672 A1* | 4/2003 | Watchko et al. | 174/50 |
| 2003/0074114 A1* | 4/2003 | Okuyama et al. | 701/21 |
| 2004/0165369 A1* | 8/2004 | Lionetta et al. | 361/818 |
| 2004/0196634 A1* | 10/2004 | Mallik et al. | 361/704 |
| 2004/0203854 A1* | 10/2004 | Nowak | 455/456.1 |
| 2004/0203923 A1* | 10/2004 | Mullen | 455/456.1 |
| 2004/0209578 A1* | 10/2004 | Schultz et al. | 455/91 |
| 2004/0233617 A1* | 11/2004 | Martin et al. | 361/600 |
| 2004/0233930 A1* | 11/2004 | Colby, Jr. | 370/464 |
| 2005/0032525 A1* | 2/2005 | Gasbarro | 455/456.1 |
| 2005/0032532 A1* | 2/2005 | Kokkonen et al. | 455/456.6 |
| 2005/0054351 A1* | 3/2005 | McAlexander | 455/456.1 |
| 2005/0143093 A1* | 6/2005 | Kim et al. | 455/456.1 |
| 2005/0148320 A1* | 7/2005 | Tanabe | 455/411 |
| 2005/0152117 A1* | 7/2005 | Belady et al. | 361/704 |
| 2005/0153707 A1* | 7/2005 | Ledyard et al. | 455/456.1 |
| 2005/0162334 A1* | 7/2005 | Saunders et al. | 343/895 |
| 2006/0241865 A1* | 10/2006 | Smith | 702/3 |

FOREIGN PATENT DOCUMENTS

| | | |
|---|---|---|
| EP | 0 817 152 A1 | 1/1998 |
| EP | 1 148 754 A3 | 4/2002 |
| EP | 1 261 221 A1 | 11/2002 |
| EP | 1 162 474 A3 | 12/2002 |
| EP | 1 286 247 A3 | 3/2004 |
| WO | WO 97/14048 | 4/1997 |
| WO | WO 00/67397 | 11/2000 |
| WO | WO 02/063327 A3 | 8/2002 |
| WO | WO 03/026143 A3 | 3/2003 |

OTHER PUBLICATIONS

Bielby, Robert,"Xilinx High-Volume Prgrammable Logic Applications in Satellite Modem Desings". Jul. 21, 2000, Xilinx, WP120(v1.0) pp. 1-6.*

Russell, Charlie, "Power Management in Windows XP," Mar. 25, 2002, Microsoft, pp. 1-6.*

Search Report for GB 0417167.4 filed Aug. 2, 2004, Dated of Search Jan. 18, 2005.

Search Report under Section 17 in the United Kingdom for corresponding GB 0417167.4, search completed Aug. 16, 2005.

* cited by examiner

DISMOUNT TABLET COMPUTER ASSEMBLY FOR WIRELESS COMMUNICATION APPLICATIONS

CROSS REFERENCE TO RELATED APPLICATIONS

The present application is related to New Gasbarro U.S. patent application Ser. No. entitled "Personal Digital Assistant Having Satellite Communications Capacity", Filed Aug. 5, 2003, assigned to the same assignee as the present application.

TECHNICAL FIELD

This invention relates to the field of portable computing devices, specifically the field of laptop or tablet computers.

BACKGROUND OF THE INVENTION

The use of communication systems having wireless mobile communication units has become widespread. Wireless communication systems that operate within a cell or coverage area provide several important advantages over conventional wired systems. For example, wireless communication users can communicate in locations where wired service is not available or feasible, such as remote or rugged locations. Additionally, wireless communication users within the cell have much more mobility because the units do not have to be connected to a fixed wired network. These and other favorable characteristics make wireless communications ideally suited for personal, business, military, search and rescue, law enforcement, water vehicle, and other field related applications.

If an area is equipped with robust communications infrastructures (e.g., cell towers), there are relatively easy ways to establish and maintain such wireless communications to mobile users, by making use of the infrastructure. However, there are some endeavors where it is necessary to provide such a wireless communications capability even while in an area that does not have such a communications infrastructure, and in such cases it is much more difficult to establish and maintain such wireless communications to mobile users.

Even in areas without such a robust wireless communications infrastructure, there are techniques that have been developed to enable the mobile members of a team to establish and maintain digital communications. For example, it has become increasingly common to provide wireless communication devices in motor vehicles. The interior of a motor vehicle provides a relatively controlled environment for such a device to operate, and the motor vehicle itself generally provides a large antenna mount and, more importantly, a ready source of power. This has allowed vehicles to incorporate a number of useful functions, including automated incident notification, two-way audio communication, and even limited information retrieval, such as sporting event results and stock reports. Several successful implementations in the military sphere have been based on netted line-of-sight radios, and netted line-of-sight radios combined with satellite data terminals designed for mobile operations.

While vehicle mounted wireless communications systems offer many convenient features, they are disadvantageous in that they require the operator to remain within the vehicle to be useful. Often, the very time where a wireless device would be most useful is a situation where a motor vehicle has become damaged or inoperative. In such a case, it may become hazardous for an operator to remain within the vehicle to make use of the communications system. Similarly, situations may arise where an occupant must leave the vehicle for another reason. For these situations, a dismount solution would be desirable that maintains much of the functionality of the vehicle communications system while maintaining a minimal size and weight.

Presently, the functionality of dismount devices is limited by a number of considerations. Increased functionality requires an increased number of components increasing the size, weight, and power consumption of the dismount device. These considerations are aggravated by the redundancy of the dismount device in the context of a vehicle communications system, as the dismount device is necessary only on those infrequent occasions where the operator requires wireless communications while separated from the vehicle.

In military applications, existing communications systems to and from individuals separated from a vehicle (referred to as dismounted users), however, have suffered from severe technical limitations that impede and degrade tactical operations in significant ways. Existing problem areas include battery life, range, relaying, safety, weight, complexity of operation, setup and configuration time, and missing functionality. Similar problems plague electronic communications to small mobile teams in other domains, such as search-and-rescue teams, and law enforcement agents in the field.

Most of these problem areas can be related to the issue of battery life; the severe limitations on battery capacity limit the transmit power, which in turn limits communications range. The same severe limitations on battery capacity also limit the transmit duty cycle (i.e., the duration or percentage of time which a transmitter can be on and transmitting), preventing a dismounted individual from communicating continuously without either receiving new batteries or having access to a battery charger for appropriate mission durations. Current implementations are so inefficient that to carry spare batteries for an entire week's worth of mission would be infeasible.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

In accordance with an aspect of the invention, a tablet computer assembly is provided. The tablet computer assembly includes a global positioning system module that produces location information associated with the position of the tablet computer assembly. An L-band satellite transceiver broadcasts the location information to at least one portable communication device through a relay network and receives location information from the at least one portable communications device via the relay network. A computer processing unit provides messages to the L-band transceiver and updates a display associated with the tablet computer assembly according the received location information and the location information produced at the global positioning system module. The tablet computer assembly can be provided with custom software and one or more antennas.

In accordance with another aspect of the invention, a vehicle communications system is provided. The system includes a dismount communications device and a mounting unit. The dismount communications device comprises a global positioning system module, and L-band transceiver, and a tablet computer. The global positioning system module determines the location of the device. The L-band transceiver receives data from at least one portable communications device via a satellite relay. The tablet computer that provides a user interface for the global positioning module and the L-band transceiver. The mounting unit allows the dismount communication device to be mechanically fixed to the interior of a vehicle and electrically connected to a power supply within the vehicle.

In accordance with yet another aspect of the present invention, a method is provided for updating location information at a tablet computer via a communications relay network. The location of the tablet computer is determined at regular intervals via a global positioning system. The determined location information is broadcast on an L-band frequency via the relay network to at least one communications device. Location information is received from at least one portable communications device on an L-band frequency via the relay network at the tablet computer. The determined location and the received location information are displayed on a display associated with the tablet computer.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
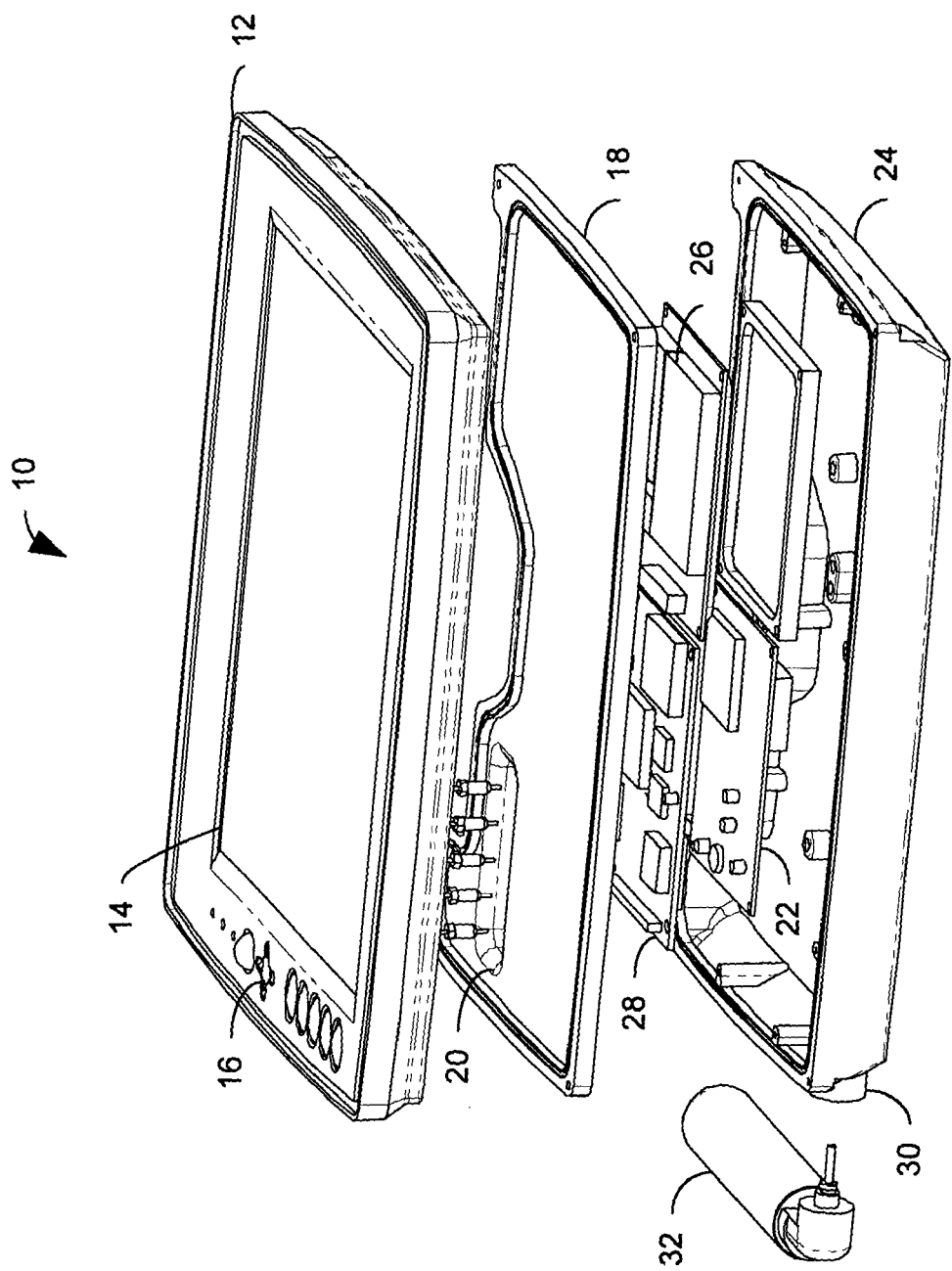
FIG. 1 illustrates an exploded view of a tablet computer assembly in accordance with an aspect of the present invention.

The present invention relates to systems and methods for utilizing one or more tablet computers in a communications network. A tablet computer can be in the form of tablet, a laptop, notebook computer or other portable computing device. The tablet computers incorporate L-band transceivers and GPS modules to allow automated communication of position data to and from other portable communications devices within the communications network. Each tablet computer can contain geographic information and appropriate software for viewing and manipulating the position data and the geographic information. The tablet computers can also include the capacity for broadcasting text messages, either with or without position data associated with the tablet. These messages can include preset messages, such as a request for supporting fire or a hazardous materials warning, or they can simply be a free-text message composed on a touchscreen keyboard.

In accordance with one aspect of the present invention, the tablet computer can comprise one element of a vehicle communications system within a tactical network. For example, the tablet computer can be mounted to a mount within the vehicle interior to serve as a display for a communications system within the vehicle. One or more ports can be made available within the tablet for electrically connecting to vehicle components to receive power or exchange data. The tablet computer can also be removed from the vehicle at need to provide a self-contained dismount communications system compatible with the tactical network.

In accordance with another aspect of the invention, the tablet computer assembly can be made modular to allow replacement of obsolete portions of the assembly without incurring significant reengineering costs. For example, a suitable tablet computer assembly can be adapted from a commercially available tablet computer. Converting an existing tablet computer requires the addition of one or more new computer boards as part of a transceiver module and an antenna to interface with GPS and L-band communications satellites. In the exemplary embodiment, the transceiver module comprises three board assemblies. The three boards include an RF transceiver assembly containing circuitry for L-band communications, an amplifier board that contains amplifiers necessary for transmitting and receiving L-band and GPS signals, and a digital board that includes a GPS module for determining the location of the tablet and control circuitry for the GPS module and the transceiver.

A major problem with incorporating additional boards is the accumulation of heat from the amplifiers and other digital components in the proximity of the heat sensitive components, such as a central processing unit and one or more memory chips, within the tablet computer. To combat the heat problem, an aluminum enclosure can be added to enclose and support the additional circuit board assemblies. In addition to acting as a heat sink for the internal circuit cards, the enclosure provides both a mechanical interface for the transceiver module and support for the satellite antenna. The enclosure also acts as a Faraday cage, which shields the internal circuitry from unwanted electromagnetic interference (EMI) radiating from external devices and the tablet computer.

The tablet computer can be connected to the transceiver module through hardwired circuitry or an expansion board. The connection to the transceiver module passes through filters installed in the lid of the Faraday cage. The design approach is modular, enabling quick replacement of damaged components, with minimal invasion to the tablet computer. Internal metal shielding with the Faraday cage provides additional protection to the RF and amplifier assemblies from both the tablet computer and the other circuit boards within the transceiver module. The present design overcomes previous problems in isolating the interference caused by normal antenna radiation patterns and internal RF emissions, which previously had interfered with the proper functioning of the compact satellite communications devices. Efficiencies gained by packaging, message representation schemes, software, a combined GPS/L-band satellite antenna, and system-level power management (including automatic GPS power cycling) combine to achieve a level of battery life that makes this device feasible and useful, and distinguishes it from all previous implementations.

FIG. 1 illustrates an exploded view of a tablet computer assembly 10 in accordance with an aspect of the present invention. A control module 12 comprises a processor (not shown) and a display 14. In an exemplary embodiment, the control module is a commercially available tablet computer, with various protective measures included to allow the tablet to withstand extreme conditions. The control module 12 can comprise one or more integrated input devices (e.g., 16) such as keypads, trackballs, and touchscreens. Alternatively, user input may be provided with an external input device through one or more input ports (not shown).

The control module 12 is fitted with a back plate 18. This back plate 18 includes an opening 20 to admit one or more data communication connections and a power supply cable between a digital board 22 and the control module 12. A Faraday cage 24, comprising a metallic enclosure mounted to the back portion of the control module 12, protects various RF circuit board components 26 and 28 from electromagnetic interference, such that the Faraday cage forms the rear portion of the tablet computer assembly 10. The back plate 18 comprises one wall of the Faraday cage 24. The digital board 22 contains control circuitry for an RF transceiver assembly 26 and a GPS module 28. In an exemplary embodiment, the RF transceiver assembly 26 operates within the L-band of the electromagnetic spectrum. In the illustrated example, the Faraday cage 24 comprises a metallic enclosure that substantially encompasses both the RF transceiver assembly 26 and the GPS module 28 to protect the transceiver and the GPS module from external electromagnetic interference.

The control module 12 is operatively connected to the RF transceiver assembly 26 and the GPS module 28 through the digital board 22, such that the control module 12 can receive information from the transceiver and GPS module and submit commands to control their operation. In an exemplary embodiment, the tablet computer assembly further comprises an input/output board (not shown) that regulates the data connection between the control module 12 and the digital board 22. In an exemplary embodiment, the Faraday cage 24 is an aluminum enclosure that serves as a heat sink that directs heat from the RF transceiver assembly 26 away from sensitive electrical components within the digital board 22 and the control module 12. The RF transceiver assembly can include additional metal shielding to reduce electromagnetic interference from components within the Faraday cage as well as to provide additional protection against exterior sources of interference.

An antenna mount 30 operatively connected to the RF transceiver assembly 26 extends through the Faraday cage 24. The antenna mount 30 includes a connector designed to mate with a similar connector on a detachable antenna 32. The antenna mount 30 allows signals to pass between the antenna 32 and the RF transceiver assembly and the GPS module 28. In an exemplary implementation, the antenna 32 is designed to allow transmission of signals at an L-band frequency to one or more satellite relays, and to receive transmissions on both the L-band and the various GPS frequencies (e.g., L1 and L2). The antenna 32 can be separated from the tablet computer assembly 10, to increase the compactness of the tablet computer assembly 10. In an exemplary embodiment, the antenna 32 is a quadrifilar helix antenna.

Figure 2:
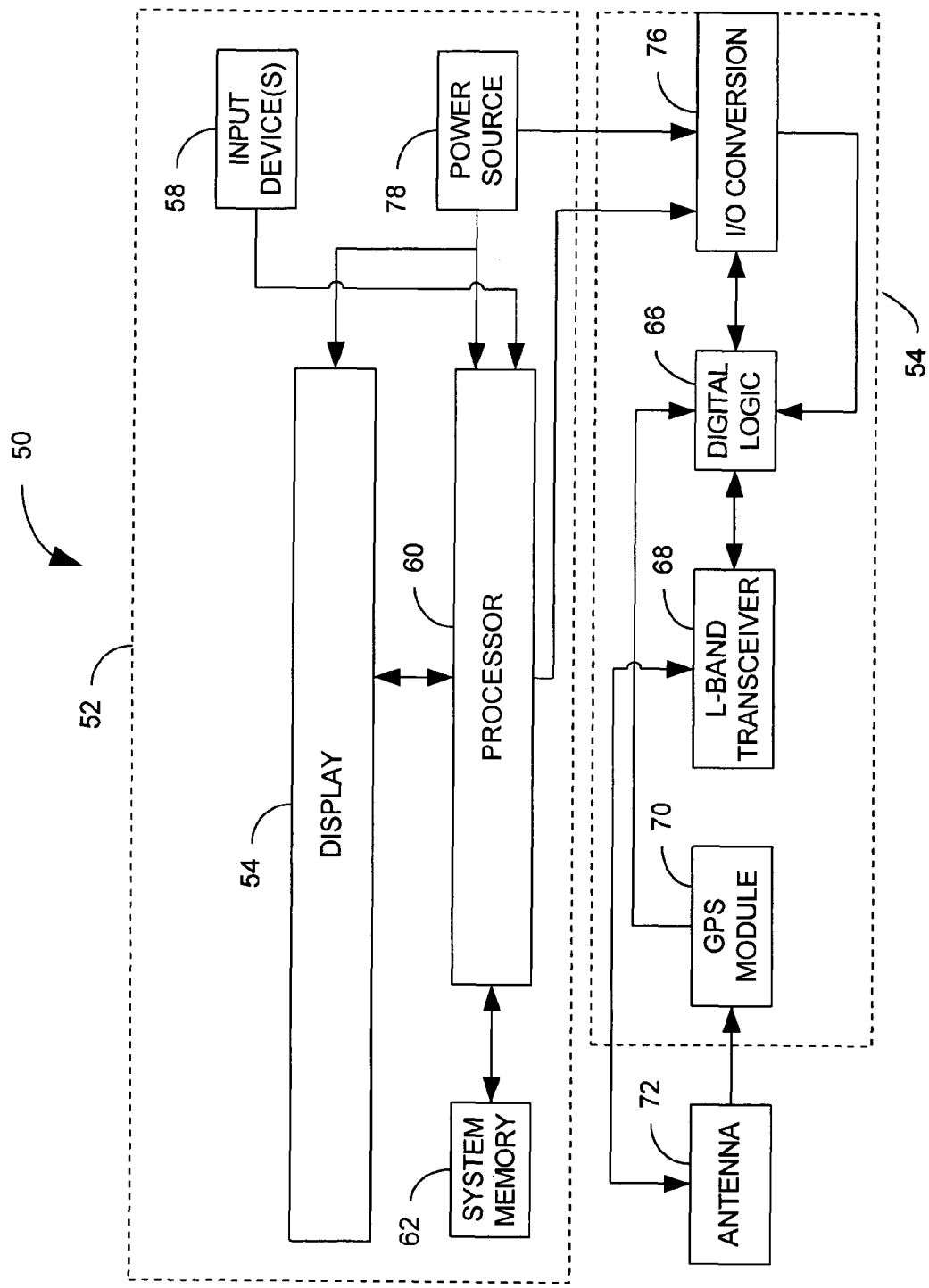
FIG. 2 illustrates a block diagram of an exemplary tablet computer assembly in accordance with an aspect of the present invention.

FIG. 2 illustrates a block diagram of an exemplary tablet computer assembly 50 in accordance with one aspect of the present invention. The tablet computer 50 includes a control module 52 that is operatively connected to a transceiver module 54. The control module 52 includes a display 56 that provides received messages and other data to a user. The display 56 can include touchscreen capabilities, through an associated stylus, for example, to double as an input device for the user. Additionally, one or more input devices 58 can be provided, such as a miniature keyboard, a mouse, a microphone, or any of a number of other suitable devices for inputting commands. The input devices 58 may be integrated into the tablet computer, or they can be provided for attachment to one or more input ports on the tablet. For example, in an exemplary embodiment, the tablet computer includes an integrated microphone and one or more speakers for audio recording and playback.

The control module further includes a processor 60 that processes user input and messages received at the transceiver 54. The processor 60 produces messages for broadcast at the transceiver 54 in response to user input. For example, the input devices 58 can allow the user to select one of a plurality of predetermined messages. In one embodiment, the user may also enter free text or voice messages via an attached keyboard, microphone, or touchscreen. The processor 60 will also process messages received at the transceiver module 54 to provide information to the user at the display 56.

The processor 60 is operatively connected to a system memory 62. The system memory 62 can comprise any of a number of data storage mediums known in the art. In an exemplary implementation, the system memory 62 comprises a block of random access memory (RAM) that serves as a working memory and a Secure Digital (SD) flash card that serves for data storage. In an exemplary battlefield implementation, the flash memory can contain one or more software programs that provide and display geographic information concerning a particular area. The memory can also include the known location of units of terrain, friendly figures, and enemy figures. This information can be updated periodically both through user input and through location update messages received at the transceiver module 54. The system memory 62 can also contain a log of messages and location updates received at the transceiver module 54.

The transceiver module 54 comprises a digital logic board 66, an RF transceiver assembly 68, and a GPS module 70. The digital logic board 66 provides a control function for the transceiver 54. For example, the digital logic board 66 can format messages to be sent by the transceiver 54 according to instructions from the control system 52. Similarly, the digital logic board 66 can reformat received messages into a form acceptable at the control module 52. This can include filtering and demodulating the messages, as well as other known signal processing techniques. The digital logic board 66 is also responsible for the conversion of data between analog and digital formats, where it is necessary. Thus, the digital logic board 66 can include an analog-to-digital converter and/or a digital-to-analog converter for digital sampling.

The GPS module 70 provides position information to be included in broadcast messages. For example, in a battlefield implementation of the tablet computer assembly 50, one of the predetermined messages available for user selection can be a request for evacuation and medical assistance. The GPS module 70 can provide location information for the requesting unit, so the information can be automatically include in the call for assistance. In addition, the location information for the unit will be automatically broadcast to one or more other portable communications devices (not shown) over a tactical network.

The RF transceiver assembly 68 contains the hardware components necessary for the communications functions of the transceiver module 54. These hardware components are located on one or more circuit boards comprising the RF transceiver assembly. For example, the RF assembly 68 can include an IF (intermediate frequency) board with frequency tuning circuitry for upmixing signals from the digital logic board 66 for transmission and for downmixing received signals to appropriate frequencies for processing, as well as an amplifier board with one or more amplifiers. In an exemplary implementation, the RF transceiver assembly 68 can include appropriate shielding to prevent interference with the processing by external electrical and magnetic fields. For example, portions of the RF transceiver assembly 68 can be encompassed by a Faraday cage to reduce external electromagnetic interference.

Signals produced at the RF transceiver assembly 68 are provided to an antenna 72. The antenna 72 can be an integral part of the tablet computer assembly 50, but in an exemplary implementation, the antenna 72 is detachable to increase the compactness of the tablet. The antenna 72 can be capable of receiving signals of multiple frequencies, including L-band transmissions and global positioning signals. The antenna 72 can assume any of a number of configurations designed to enable long-range transmission of RF signals at minimal power. In an exemplary implementation, the antenna has a helical configuration stretching over a length of approximately four inches.

An input/output conversion card 76 regulates the logic and power connections between the control module 52 and the transceiver module 54. For example, the input/output conversion card 76 can regulate a power supply voltage to the transceiver module 54 via a DC-to-DC converter that produces an appropriate supply voltage from a power supply 78 associated with the control device 52. The input/output conversion card 76 can also regulate the logic level of signals passing between the control device 52 and the transceiver module 54. For example, where the control device 52 and the transceiver module 54 operate at different voltages, the input/output conversion card 76 can comprise a voltage regulator for converting a logic signal at a first characteristic voltage into a logic signal at a second characteristic voltage.

Figure 3:
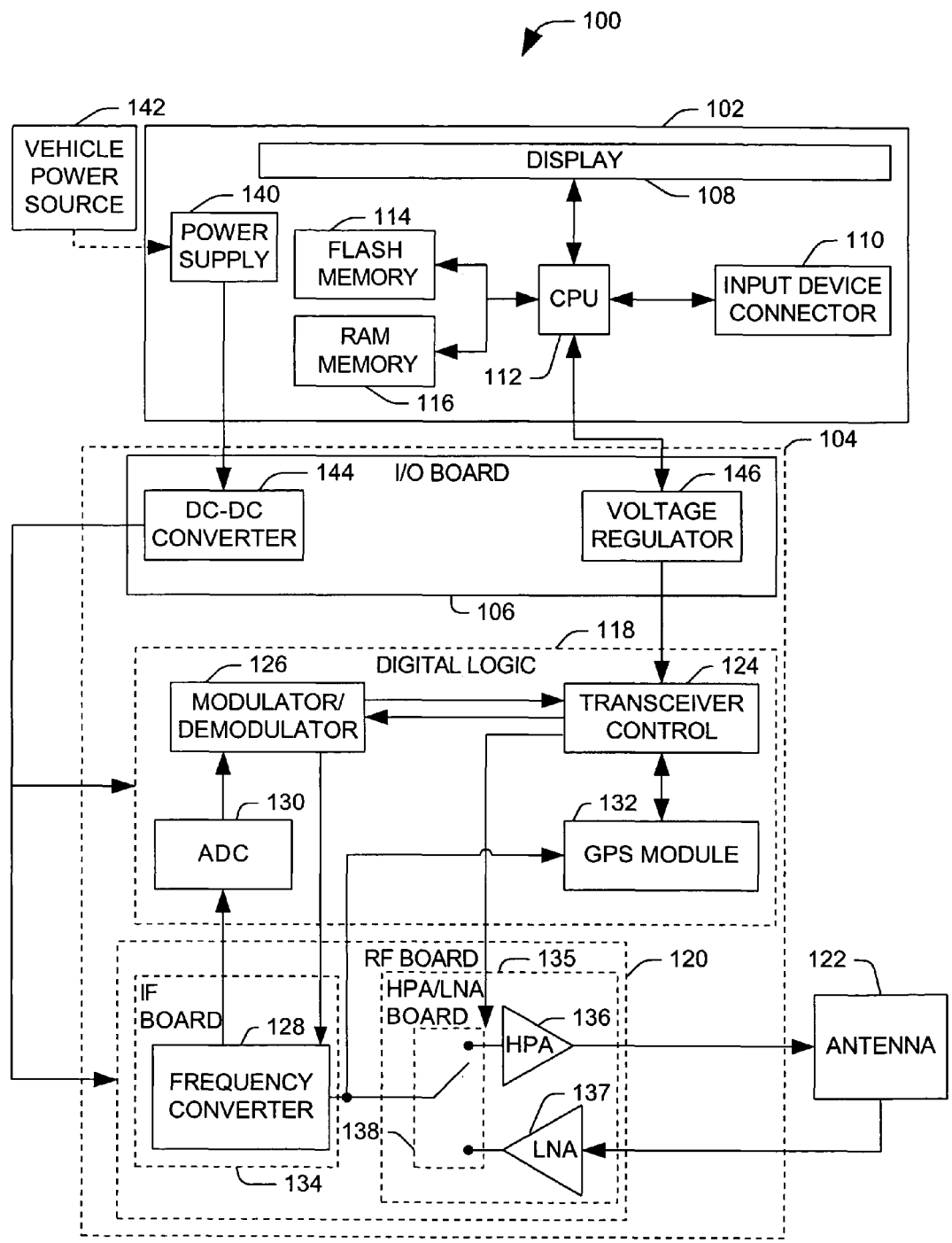
FIG. 3 illustrates a schematic block diagram of an exemplary implementation of a tablet computer assembly as part of a battlefield tactical network in accordance with an aspect of the present invention.

FIG. 3 illustrates an exemplary implementation of a tablet computer assembly 100 in accordance with an aspect of the present invention. In the exemplary implementation, the tablet computer assembly 100 is a dismount portion of a vehicle communications system within of a battlefield tactical network that shares location information among a plurality of mobile and portable communications systems. Accordingly, the tablet computer assembly 100 of the exemplary implementation can be mounted to the interior of a vehicle to provide communications capability to an occupant of the vehicle. When the occupant departs the vehicle, the tablet computer assembly can be removed to provide a portable communications assembly. It will be appreciated, however, that the tablet computer assembly 100 of the present invention is not limited to this use and can be used in a variety of applications requiring compact communications and navigation devices.

The tablet computer assembly 100 includes a control portion 102 that processes information to display to a user and receives user input and a transceiver module 104 allows the tablet computer 100 to communicate with one or more other communications devices. An input/output board 106 within the transceiver module 104 regulates power and logic connections between the control module 102 and the transceiver module 104.

In an exemplary embodiment, the control module 102 is part of a tablet computer adapted to provide control logic to the transceiver 104 module. These adaptations can include providing the tablet computer with additional control software as well as hardware changes. For example, a connection to a power supply associated with the tablet computer may be provided to power the transceiver 104. Similarly, control logic from the tablet computer can be routed through a serial port to allow for more efficient connectivity with the transceiver.

The control module 102 includes a display 108 that provides information to a user. In the exemplary implementation, the display 108 is a touch sensitive display that doubles as a touchscreen input for the tablet computer assembly 100. The control module 102 can include one or more other connections 110 for the addition of external input devices, such as keyboards, trackballs, and similar devices. A central processing unit 112 receives communication requests as input from the display 108 and encodes each request as a message readable by the transceiver module 104. The processor 112 then provides the encoded request to the transceiver module 104 through the input/output board 106.

The processor 112 also generates a map image on the display 108 based on data stored on a flash card 114 and a random access memory (RAM) 116. In an exemplary embodiment, the RAM 116 is a block of synchronous dynamic random access memory (SDRAM). The RAM 116 can include messages recently received at the transceiver module 104, such as position updates for friendly and enemy units. Received messages can be queued within the RAM 116 for a time and then written to the flash card 114 for later reference. The flash card 114 can also include geographic data concerning an area of interest and the locations of various items of interest. The flash card 114 can also contain software allowing the user can manipulate the displayed map via the touchscreen display or an external input device.

The transceiver module 104 comprises a digital board 118 and an RF board 120. The transceiver module 104 also includes a mount for a detachable antenna 122. The digital board 118 includes a transceiver control 124 that handles network protocol for communications with the tactical network. The transceiver control 124 also provides an application programming interface to external applications. The digital board 118 further comprises a modulator/demodulator 126 that translates between the baseband signal associated with the transceiver control 124 and the intermediate frequency associated with the a frequency converter 128 on the RF board 120.

In an exemplary embodiment, the modulator/demodulator 126 comprises a field programmable gate array (FPGA) configured to provide the acquisition of a forward channel from the tactical network and to track the signal within that channel. After acquiring and tracking the signal from the forward channel, the FPGA decodes the forward error correction information coded into the data and provides the signal information to the transceiver control 124 for further processing. When the tablet computer assembly 100 is transmitting information, the FPGA receives encoded network layer bits from the processor and provides link and physical layer processing to produce an intermediate frequency signal. The intermediate frequency signal is then provided to the RF assembly 120 for upconversion and transmission.

An analog-to-digital converter 130 is provided to digitally sample incoming signals and provide the samples to the modulator/demodulator 126. The digital board 118 further includes a GPS module 132 that determines the location of the tablet computer assembly 100 upon a command from the processor 112. In an exemplary embodiment, the GPS module 132 receives radio frequency input directly from the RF board 120 via a coaxial connector split off from the signal path. The present location of the tablet computer assembly 100 can be determined from this input as is known in the art. The generated location information is made available to the transceiver control 124 for inclusion in outgoing location update messages to the tactical network.

The RF assembly 120 comprises an IF board 134 and an HPA/LNA amplifier assembly 135. The IF board includes a frequency converter 128. The amplifier assembly includes a high power amplifier 136, a low noise amplifier 137, and a switch 138 that switches the RF assembly 120 between a transmit and a receive state. When the tablet computer 100 is transmitting information, the frequency converter 128 upconverts a modulated intermediate frequency signal provided by the modulator/demodulator 126 to a radio frequency and provides it to a high power amplifier 136 via the switch 138. The amplified signal is then provided to the antenna 122 for transmission. In an exemplary embodiment, the antenna 122 is a detachable quadrifilar helix antenna operative to receive both L-band frequencies and the frequencies associated with global position systems (e.g., L1 and L2).

When the tablet computer assembly 100 is receiving information, a signal is received at the antenna 122 and amplified at a low noise amplifier 137. The amplified radio frequency signal is passed through the switch 138 to the frequency converter 128 for down conversion to an intermediate frequency. In an exemplary embodiment, the components of the RF board 120 are enclosed in a Faraday cage (not shown) to reduce electromagnetic interference with the transmitted and received RF signals.

The transceiver module 104 is powered by an internal power supply 140 associated with the control module 102. In an exemplary embodiment, the internal power supply 140 comprises one or more rechargeable batteries generating between sixteen and twenty-five volts. When the tablet computer assembly 100 is mounted within a vehicle, the assembly can be electrically connected to a vehicle power supply 142 to continuously recharge the internal power supply 140. An electrical connection can be made available through a power supply port (not shown) on the control module 102 to allow an electrical connection between the internal power supply 140 and the vehicle power supply 142.

The power supply voltage is provided to a DC-to-DC converter 144 on the I/O board 106, which converts the voltage down to a necessary voltage for the transceiver module 104. In an exemplary embodiment, the transceiver module 104 requires a power supply within a range of ten to about fourteen and a half volts, and the DC-to-DC converter 144 provides a twelve-volt supply to the transceiver 104. The specific voltage levels experienced by the DC-to-DC converter can be adjusted according to the respective power requirements of the control module 102 and the transceiver 104.

The I/O board 106 further includes a voltage regulator 146 that standardizes the voltage level of the logic signals passing between the control module 102 and the transceiver module 104. In the exemplary embodiment, the control module 102 operates at a voltage of five volts, but the transceiver module 104 requires logic signals at 3.3 volts. The voltage regulator 146 converts the five-volt logic of the control module into the 3.3 volt logic appropriate for the transceiver. In an exemplary embodiment, the transceiver module 104 can be adapted to accept logic signals at the same voltage as the control module 102, rendering the voltage regulator 146 unnecessary.

Figure 4:
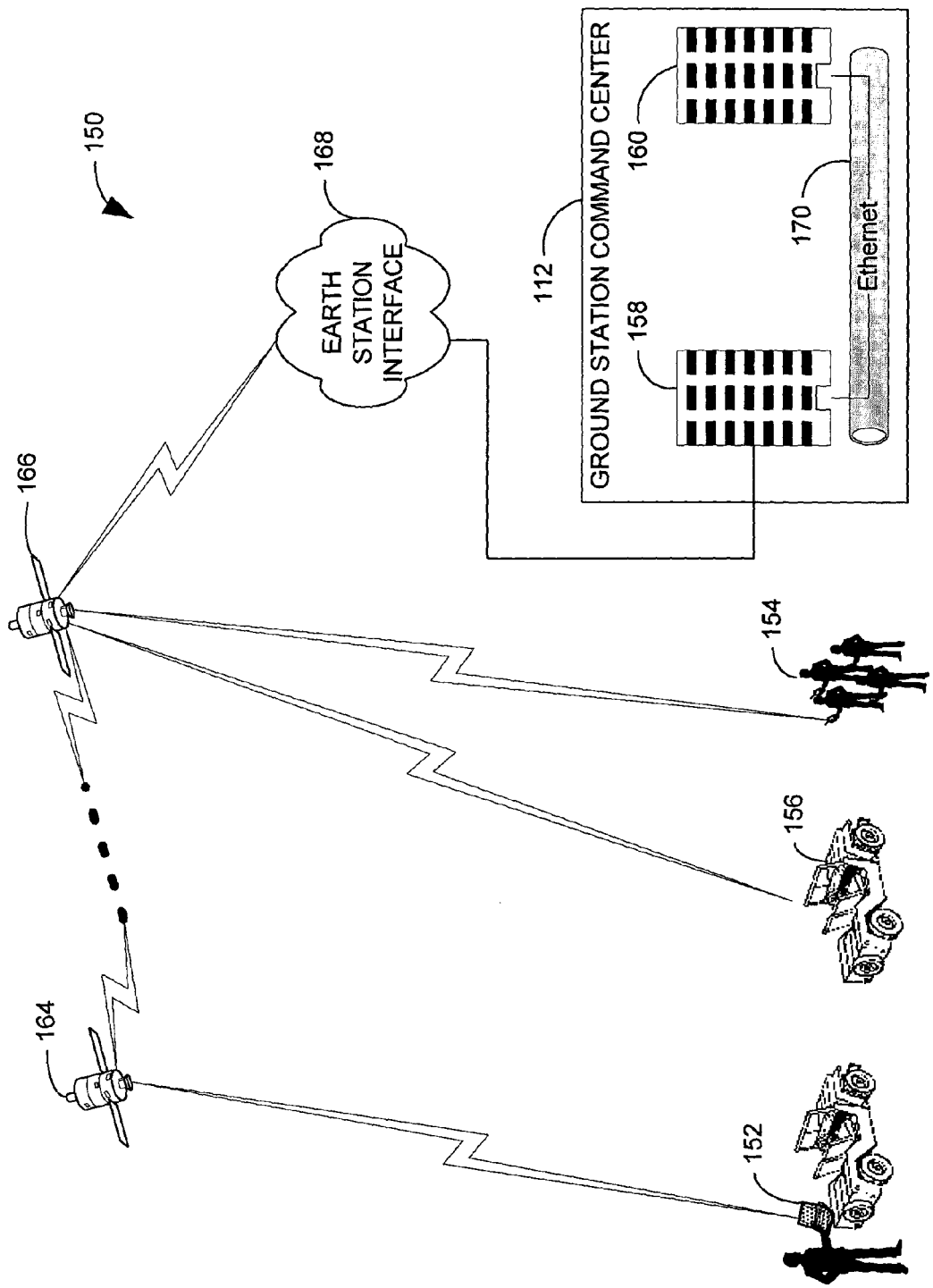
FIG. 4 illustrates an exemplary relay network in accordance with one or more aspects of the present invention.

FIG. 4 illustrates an exemplary communications system 150 in accordance with one or more aspects of the present invention. The exemplary communications system 150 comprises a tablet computer 152 in accordance with an aspect of the present invention, as well as a plurality of other communications devices 154-160, operative at least to transmit and receive text messages and location information among themselves. These communications devices can include portable communications devices 154, for dismounted soldiers, mobile communications devices 156, such as those found in vehicle units, and stationary communications platforms 158 and 160, as might be expected in a command center. The communications system 100 facilitates transmissions between communications devices 154-160 at reduced power requirements, thus extending the useful life of batteries in portable and mobile units while also reducing the size and weight of associated power supplies.

The communications system 150 further comprises a relay network comprising a plurality of relays (e.g., 164 and 166) that are arranged to relay messages over a predetermined coverage area. The relay network can include ground installations, spacecraft, and other appropriate relay platforms. The relays (e.g., 164 and 166) are operative to receive transmissions from a tablet computer 152 and to re-broadcast the transmissions at the same or boosted power levels to communications devices (e.g., 154-160) within the coverage area. The transmissions can be passed along the relay network until an appropriate relay (e.g., 166) is found to re-broadcast the transmission to one or more intended recipients.

In one example, a location update message is provided by a tablet computer 152. The message can contain a geographic location, expressed in a standard set of coordinates, a unique identification string for the tablet computer 152, and any necessary error coding or routing information. Any of a variety of encryption mechanisms (e.g., hashing, key pairs) can be employed to encrypt the message for security purposes. The generated message is multicast by the tablet computer as an analog signal.

The transmitted message is received at a relay 164 within the relay network. The relay 164 will analyze the routing information within the signal and determine one or more appropriate relays within the network to re-broadcast the signal, as o make it available to the intended recipients of the message. The analog signal is sent to and re-broadcast by one or more appropriate relays (e.g., 166) at increased power levels so as to reach the intended recipients within the coverage area. It will be appreciated that the relay network can consist of terrestrial relays as well as spacebound relays. For example, signals from a satellite relay (e.g., 166) can be received at an earth based station interface 168 and provided to a first stationary communications platform 158. A land-based Ethernet connection 170 can be provided to carry signals to a second stationary communications platform 160 outside of the coverage area of the satellite relays The relayed signal is received at one or more communication devices (e.g., 154-162) within the tactical network. At each receiving device (e.g., 154), the signal is processed to produce updated position data for the transmitting tablet computer 154. This processing can include filtering and demodulating the signal, as well as decrypting the transmitted message and identifying the originating communication device (i.e., the tablet computer 152). Once it has been extracted from the received signal, the message is stored in memory and provided to a processor within the receiving device (e.g., 156). The processor provides appropriate input to an associated display to update the position of the originating communications device 152.

Figure 5:
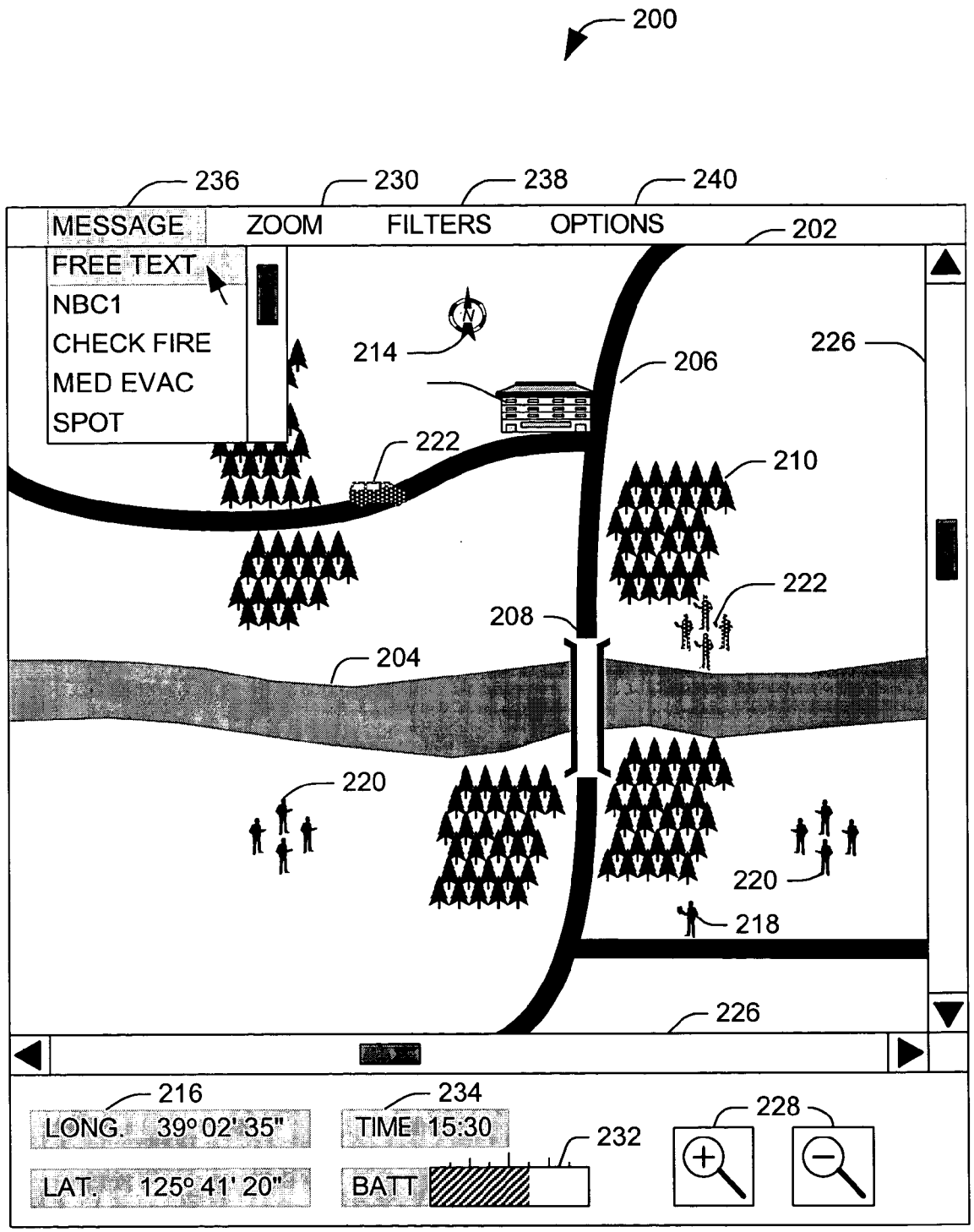
FIG. 5 illustrates an exemplary display from a tablet computer in accordance with one or more aspects of the present invention.

FIG. 5 illustrates an exemplary display 200 from a tablet computer in accordance with one or more aspects of the present invention. The display shows a map 202 of an area, including elements of the terrain, such as rivers 204, roads 206, bridges 208, and wooded areas 210. The map 202 may also include a compass 212 and a legend 214 to assist with reading the map. The system memory can include location information 216 (e.g., longitude, latitude) from a global positioning module to allow the various elements of terrain to be presented on the map relative to the position 218 of the tablet computer.

Other items of interest may also be represented on the map on the tablet computer. In an exemplary battlefield implementation of the tablet computer, the positions of friendly 220 and enemy units 222. The respective locations of friendly units can be provided, for example, via periodic updates to the tablet computer. Similarly, the respective locations of enemy units can be determined by soldiers on the ground and broadcast from a portable communication device as a location update. This allows the user of the tablet computer to be aware of the locations of both friendly and hostile units and react accordingly.

. The display 200 includes one or more scroll bars 226 for controlling the positioning of the map 202. The perspective, or zoom, of the map can be controlled either by one or more touchscreen buttons 228 on the display 200 or by a drop-down menu 230 that allows the user to set a preferred perspective. The display also includes the global position 216 (e.g., longitude and latitude) of the tablet computer, the battery status 232 and the current time 234. The global position information and time can be provided by a GPS module.

The display 200 further includes a plurality of drop down menus. A message drop down menu 236 allows a user to choose from a list of message options. These entry options can include a number of preset messages. For example, the NBC1 option can be used to instantly send a message indicating the presence of nuclear, biological, or chemical weapons along with a location obtained from the GPS module. Similarly, the SPOT option allows for automated reporting of the location of enemy troops. In an exemplary embodiment, the type (e.g., artillery, infantry, etc.) and approximate number of the enemy troops can be entered at a menu along with an estimate of their location. The Medical Evacuation and Check Fire commands work similarly, broadcasting a request for assistance from the user with location data for the tablet computer.

When a preset message is not appropriate for a particular message, a user can select the free text entry as an option. Free text can be entered via an attached keyboard, or as part of an on-screen keyboard accessible via an appropriate input device, such as a touchscreen or a mouse. In an exemplary embodiment, free-text messages can be assigned a destination device by the user. For example, it might be desirable to send a free-text message only to the commander of a particular unit. The free-text messaging function can include a drop-down menu that allows the commander to be chosen as a recipient, as well as an option for excluding personnel below a particular rank.

A zoom drop-down menu 230 allows the user to select a zoom perspective for the displayed map. A filter menu 238 allows filters to be applied to the map image. For example, the map 202 can be filtered to display only enemy units. Alternatively, the map can be filtered to show only units of a certain type, such as infantry or artillery. It will be appreciated that the filters can include other functions, and need not be limited to the above. An options menu 240 allows a user to determine the network status, review logged messages, and change any necessary settings on the navigation and tracking software. It is to be appreciated that the information presented in FIG. 5 is exemplary only, and that more or less information could be presented on one or more screens in similar or different manners.

Figure 6:
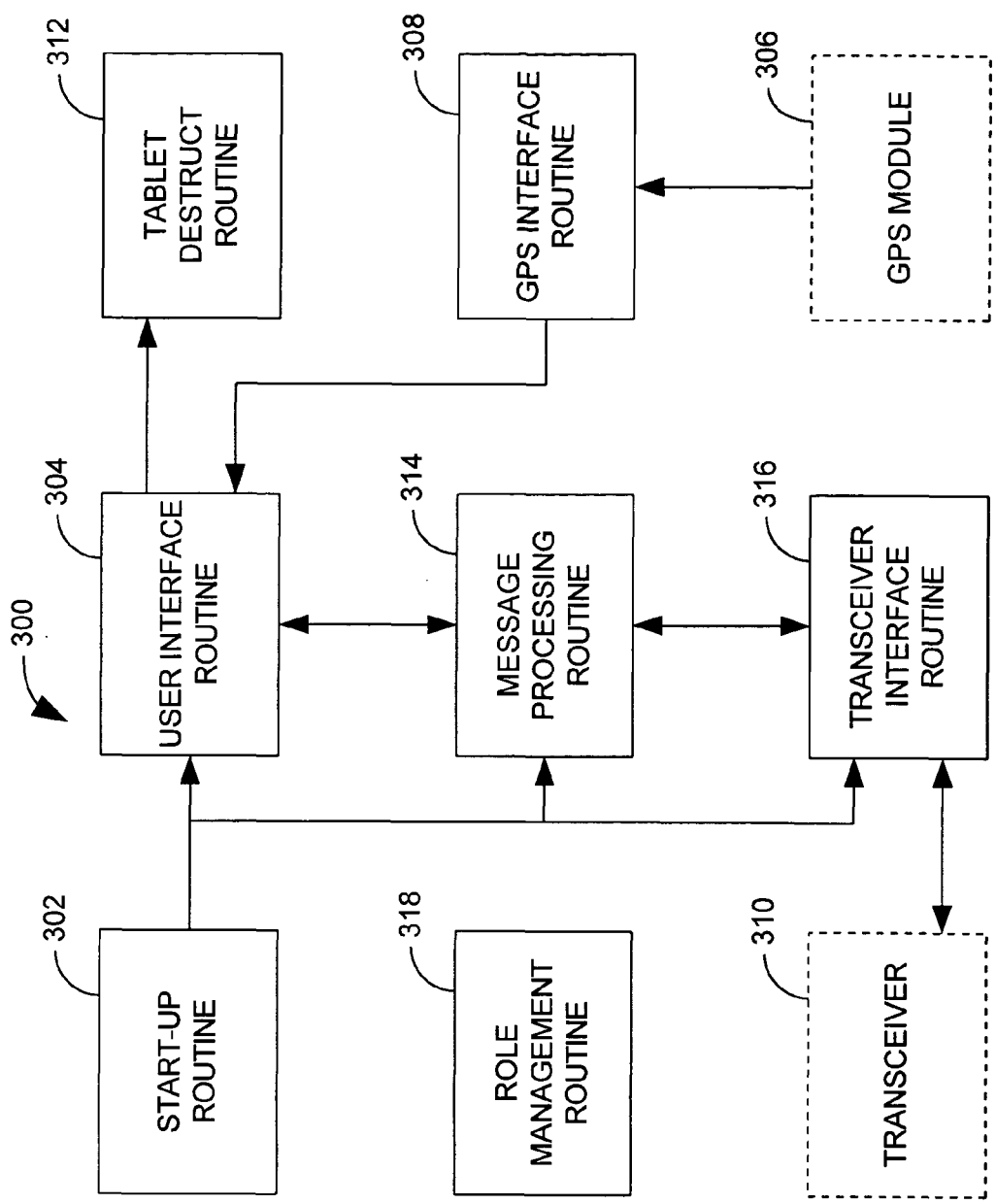
FIG. 6 illustrates software architecture for an exemplary navigation and tracking software program operative on a tablet computer in accordance with one or more aspects of the present invention.

FIG. 6 illustrates software architecture 300 for an exemplary navigation and tracking program operative to run on a tablet computer in accordance with one or more aspects of the present invention. It will be appreciated that the illustrated software architecture 300 operates in conjunction with a standard operating system designed for use in a mobile computing environment. Accordingly, the various functions performed by the described software can include functions or routines provided with the operating system. For example, the operating system can provide routines for accepting input at an input device. In an exemplary implementation, the software architecture operates in conjunction with a Windows CE operating system. Among other functions, the Windows CE operating system provides device drivers for the various input devices associated with the tablet computer, network protocols, and general object handling protocols.

A start-up routine 302 initializes the software architecture 300 when the navigation and tracking software is started. The start-up routine 302 can be called as part of the overall start-up process of the tablet computer's operating system, such that the navigation and tracking software is initiated upon powering up the tablet computer. The start-up routine 302 can reset all objects and classes associated with the software architecture to an appropriate initial state and prepare a location associated with a working memory within the tablet computer to receive location data and text messages. The start-up routine 302 can include a start-up sequence of commands, such as a command to display a map screen at a particular level of detail, broadcast a location update giving the present position of the tablet, and update the location of the tablet on the map.

A user interface routine 304 formats data from other software routines within the architecture 300 to be shown on a display (not shown). For example, location data associated with the tablet computer can be obtained via a GPS module 306 on the tablet. A GPS interface routine 308 interprets the GPS module 306 and provides the data to the user interface routine 304 in a usable form. The GPS interface routine 308 also drives the GPS module 306 periodically to produce updated location data according to a predetermined update schedule. The user interface routine 304 is responsive to commands from an input device, such as a touchscreen keypad. This can include commands to adjust the display of data, to generate a message for an associated transceiver 310, or to initiate a tablet destruct routine 312 that completely erases and destroys the device memory.

The tablet computer assembly can contain security protocols besides the memory destruction of the tablet destroy routine 312. For example, the tablet computer assembly can include remote challenge protocols, remote lockout protocols, remote memory destruction, and remote re-keying of the L-band SATCOM transceiver from a central station.

When a command is received requiring the broadcast of a message at the transceiver, the user interface routine 304 provides the command to a message processing routine 312. The message processing routine 312 generates an appropriate message according to the user command and provides the message to a transceiver interface routine 314. The message processing routine can also generate automated messages according to a predetermined schedule. The generated message can include location data provided from the user interface process 304 as well as appropriate encryption. Where a message is received at the tablet computer, the message processing routine 312 decrypts the message, logs it to a memory, and assigns a time and date stamp to the message. Any text or position data provided within the message is then extracted and provided to the user interface routine 304 to be displayed to the user.

The transceiver interface routine 314 interfaces with the control circuitry of the transceiver 310 to drive the processor to broadcast messages from the message processing routine 312. The transceiver interface can drive the transceiver to error code a message and modulate to a radio frequency signal. The message is then amplified and broadcast over an associated antenna. The transceiver interface routine 314 also oversees the demodulation and error checking of messages received at the transceiver 306. Once the message is demodulated and checked for error, it is passed to the message processing routine 312.

Figure 7:
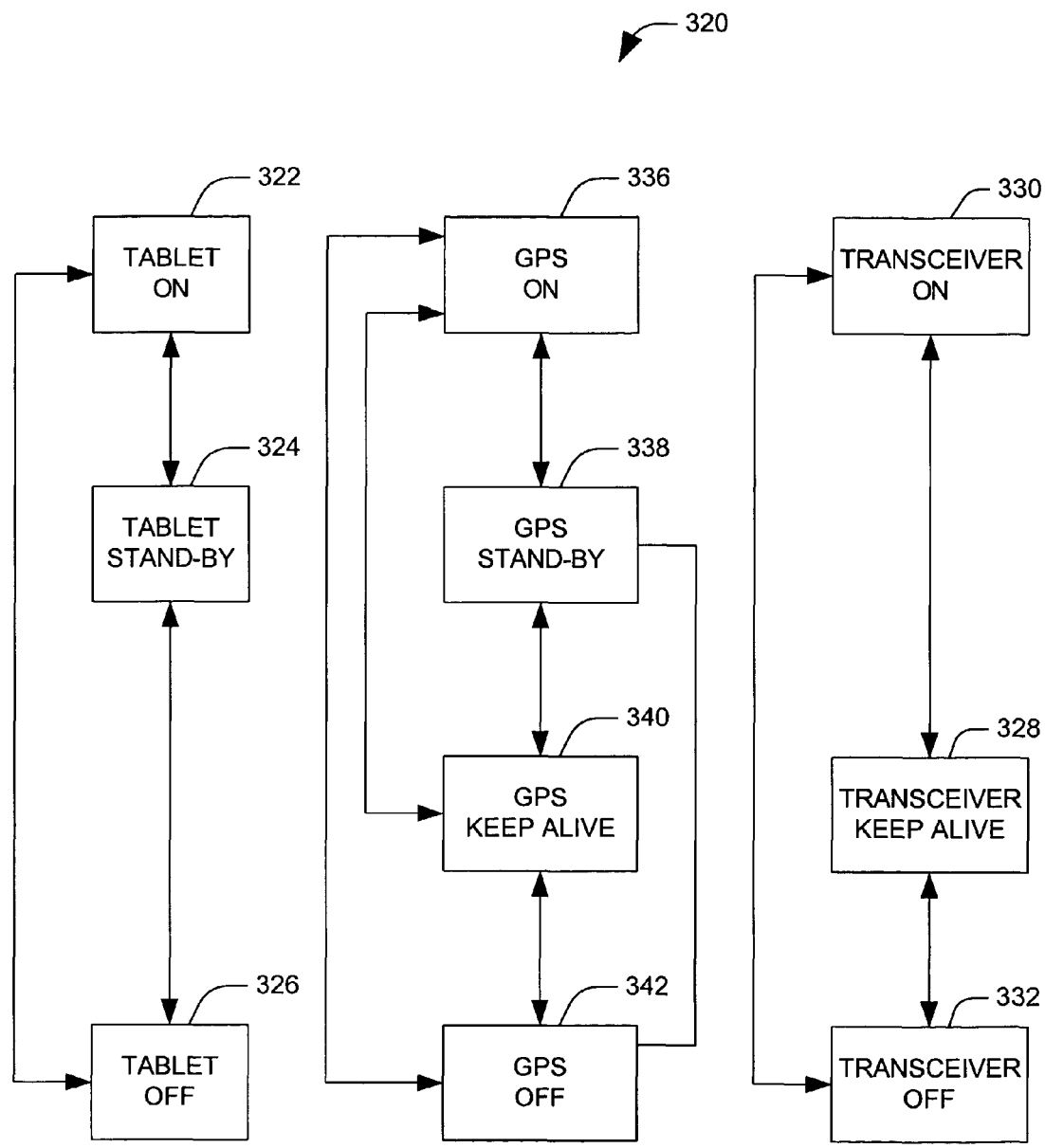
FIG. 7 illustrates power management states of an exemplary tablet computer assembly in accordance with one aspect of the present invention.

FIG. 7 illustrates power management states 320 of an exemplary tablet computer assembly in accordance with one aspect of the present invention. Extending the effective battery life of the tablet computer to useful levels requires careful management of power resources within the tablet computer, the transceiver, and the GPS module. Accordingly, each of the tablet computer, the transceiver, and the GPS module can be controlled by one or more customized software applications running at the tablet computer or the digital board to alternate between various states of activity and power consumption.

The transitions between the various stages instigated by one or more conditions required by the control software. For example, the software can transition the tablet to a state of lower power consumption, such as a blank display condition, when it has not received input from a user for a predetermined period. The transitions can also be instigated directly by user input at a graphical user interface on the tablet. The graphical user interface can display an estimate of the remaining battery power for the device to guide the user in determining an appropriate power consumption state for the tablet, the transceiver, and the GPS module. The tablet can produce visual and audible alerts when the battery level reaches one or more predetermined levels.

Turning to the illustrated stages 320, when the tablet is displaying or receiving information, it remains in a Tablet On mode 322. This is the mode of the highest power consumption for the tablet, and it provides full functionality to the user. In the On mode 322, the tablet can display geographical information and received location updates, receive additional location updates from the transceiver and the GPS module, and process message requests from the user.

When the tablet has been idle for a set period of time, the tablet will enter a Stand-by mode 324. In the tablet stand-by mode 324, the tablet will blank its display until it receives input the user. In an exemplary embodiment, the tablet can transition from Stand-by mode 324 to On mode 322 when it receives input from the GPS module, or the transceiver, providing an audible alert to the user that updated information is available.

The lowest power consumption stage for the tablet is the Tablet Off mode 326. The Off mode 326 can be selected by a user or automatically selected after a predetermined idle period for the tablet. As the name would suggest, in the Off mode 326, the tablet cannot display or receive information or receive user input until it is restarted. Position updates and text messages received during the tablet Off mode will not be stored at the tablet, but in an exemplary embodiment, incoming messages can be cached at the transceiver control hardware until the tablet is reactivated.

The transceiver is also controlled by circuitry, and can be transitioned through its power management stages by control software at the transceiver as well as the tablet software. The transceiver generally remains within a Keep Alive mode 328 until it is necessary to receive or transmit data. In the Keep Alive mode 328, the transceiver consumes a minimal amount of power to monitor the antenna for incoming signals and to maintain memory in power sensitive applications within the transceiver control. The transceiver only transmits data at a user command and at predefined intervals, so the transceiver will generally spend a majority of its operation at the Keep Alive mode 328.

The transceiver is switched to an On mode 330 when it is actively transmitting and receiving data. This can be the result of user intervention (e.g., a message request) or automated processes within the control software of the tablet and the transceiver (e.g., a scheduled location update transmission). The transceiver can also be switched to an ON mode 330 in response to an incoming transmission. A transceiver off mode 332 can be selected by the user or by a control process for situations requiring extreme power conservation. While in the Off mode, the transceiver cannot send or receive messages and can lose queued data stored in memory within the transceiver control circuitry.

The GPS is controlled through GPS power cycling software at the GPS module and has three primary power modes 336, 338, and 340, as well as an Off stage 342. At a GPS On mode 336, the GPS has normal functionality. In other words, the GPS module determines the location of the tablet and provides this information to the tablet. The GPS module remains in a Stand-By mode 338 between periodic position updates. As it is only necessary to update the location data for the tablet information at periodic intervals (e.g., every 150 seconds), the GPS module In the Stand-by mode 338, the GPS module does not actively acquire position data, but maintains a ready state to conduct periodic updates of the device position.

The third primary power mode is a Keep Alive mode 340. The Keep Alive mode has the lowest power consumption of the three primary power modes. The Keep Alive mode provides enough power to retain data stored in nonvolatile memory, such as almanac data, cryptography parameters, operator entered data, the current time, the last recorded position, and similar data. In an exemplary embodiment, there is a timeout period in which the transceiver will switch to Keep Alive mode if no operator interaction has occurred in the GPS ON mode 336. Finally, a GPS off mode 342 can be selected by the user or by a GPS control process for situations requiring extreme power conservation. While in the Off mode 342, the GPS cannot send or receive messages and will lose any stored initialization data in memory. It would thus be necessary for the GPS module to repeat the "first fix" initialization process when reactivated.

Figure 8:
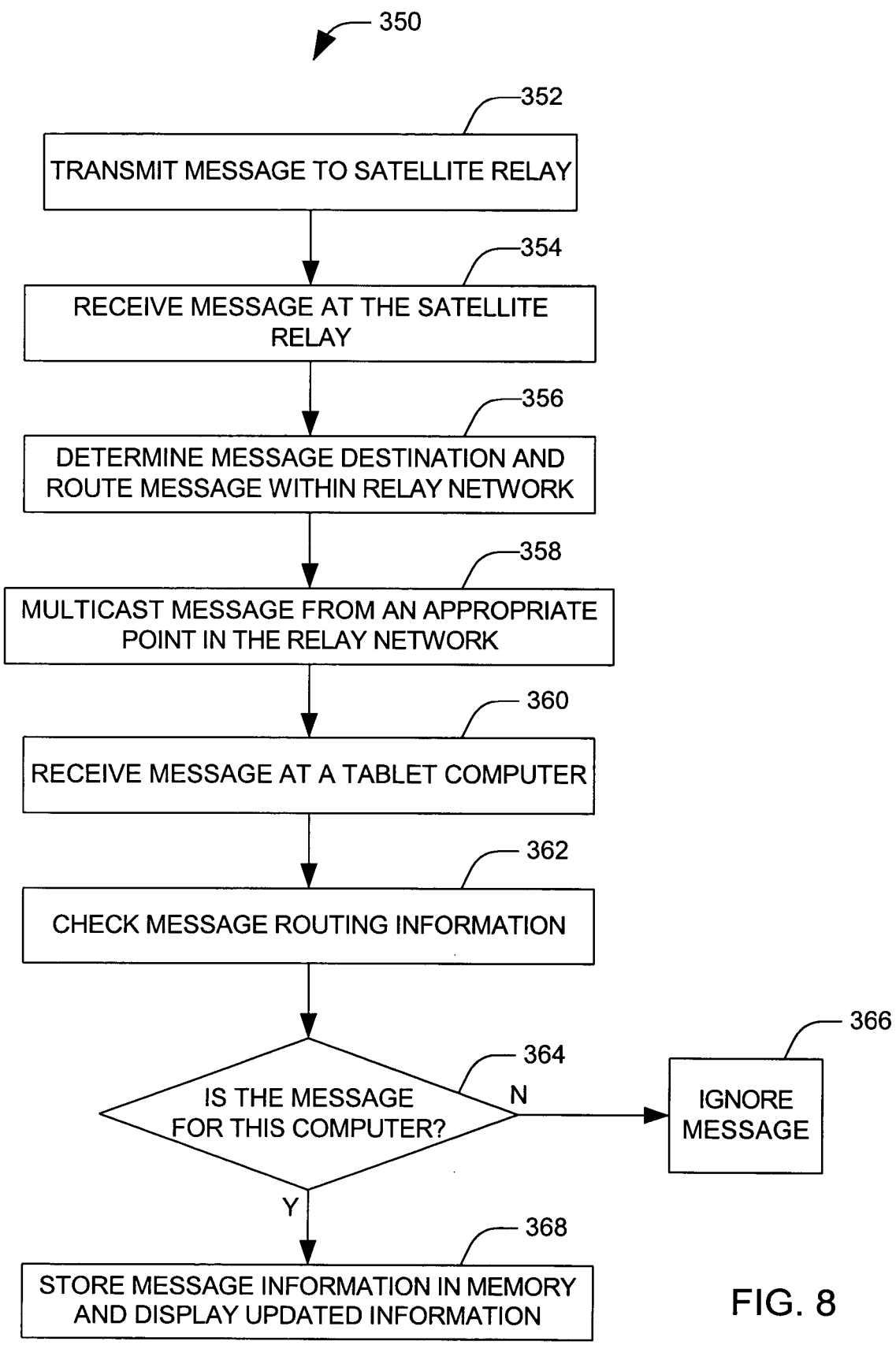
FIG. 8 illustrates an exemplary methodology for updating location data at a tablet computer in accordance with an aspect of the present invention.
Figure 9:
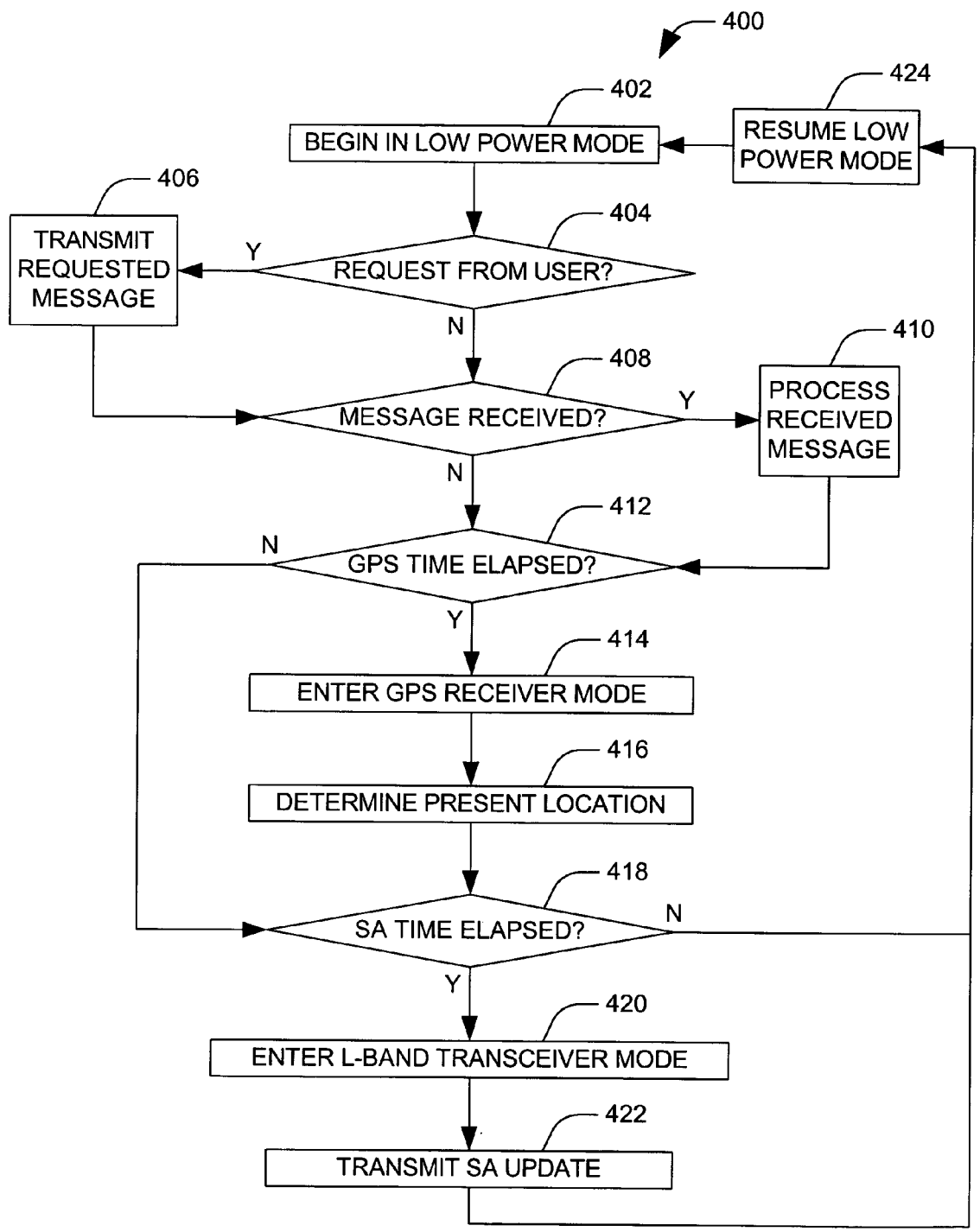
FIG. 9 illustrates an exemplary methodology for the operation of a tablet computer in accordance with one or more aspects of the present invention.

In view of the foregoing structural and functional features described above, methodologies in accordance with various aspects of the present invention will be better appreciated with reference to FIGS. 8 and 9. While, for purposes of simplicity of explanation, the methodologies of FIGS. 8 and 9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 8 illustrates an exemplary methodology 350 for updating information associated with a portable communications device at a tablet computer in accordance with an aspect of the present invention. The methodology begins at 352 wherein a message is sent from a portable communications device to a satellite relay. The message can contain any or all of location data for the device, a unique identification for the device, a text message, and routing information to ensure that the message is received only by an associated plurality of portable communication systems. The satellite relay comprises part of a relay network establishing a communication coverage area.

At 354, the message is received at the satellite network. At 356, routing information within the message is processed to determine which of a plurality of relay points within the relay network should rebroadcast the message to the associated plurality of portable communication devices. The friendly communication units can include tablet computers intended for dismounted units in accordance with the present invention, as well as larger tactical systems within vehicles and stationary encampments. One or more selected relays can re-broadcast the message at a power level substantially larger than the received message signal to increase the coverage area of the tactical communication system. At 358, the message is multicast at the one or more selected relay points.

At 360, the rebroadcast message is received at the tablet computer. The message is checked for routing data at 362, and at 364, the tablet computer determines if the message is intended for the tablet computer. If not, the methodology advances to 366 where the message is ignored. If the message is intended for the tablet computer, the methodology advances to 368, where the display of the tablet computer and the system memory are updated to reflect the information from the message. For example, if the message includes location data, the system memory will be changed to reflect the new position of the originating object will be moved relative to the map on the display. If the message includes a text message, the message will be logged in the memory, and the message will be displayed at the screen of the tablet computer.

FIG. 9 illustrates an exemplary methodology 450 for the operation of a tablet computer assembly in accordance with one or more aspects of the present invention. The methodology 450 begins at 452, with a transceiver module associated with the tablet computer assembly in a low power, or sleep mode. The methodology continues at 454, where the tablet computer determines if any message request has been input by a user. For example, the user can request that the assembly send a preset message to a relay network requesting assistance. If a request has been received, the tablet computer assembly generates and broadcasts the requested message at 456. The methodology then proceeds to 458. If no request is received from the user, the methodology proceeds directly to 458.

At 458, the tablet computer assembly determines if any incoming messages have been received. In an exemplary implementation as part of a tactical battlefield network, a received message could be a position report updating the position of a friendly unit, a spot report giving the present location of an enemy unit, or a text message from one of a plurality of portable communications devices within a logical network associated with the tablet computer assembly. If an incoming message has been received, the tablet computer processes the incoming message at 460 and updates a memory and a display associated with the tablet computer to reflect the message data, and the methodology advances to 462. If no messages have been received, the methodology proceeds directly to 462.

At 462, the tablet computer determines if a first, predetermined interval of time has elapsed. At the end of this interval, the tablet computer assembly updates its location information using a GPS module. In an exemplary embodiment, the first interval has a length of two and one-half minutes. If it is necessary to update the GPS location information, the transceiver module enters a GPS receiver mode at 464. In the GPS receiver mode, the transceiver module sends received L1 and L2 signals directly to a GPS module for analysis. The methodology then continues to 466, where the GPS module analyzes the received signals to determine the present location of the tablet computer assembly. This can be accomplished by any of a number of means known in the art. The methodology then advances to 468. If the first predetermined interval has not elapsed at 462, the methodology proceeds directly to 468.

At 468, the tablet computer determines if a second, predetermined interval of time interval has elapsed, indicating that a situational awareness message should be broadcast to a relay network for multicast to one or more friendly units in the area. In an exemplary embodiment, this second interval has a length of five minutes. If the second interval has elapsed, the methodology advances to 470, where the transceiver module enters an L-band transmission mode. At 472, the transceiver broadcasts an L-band transmission to one or more friendly units through a relay network. This transmission will include the present position of the tablet computer assembly. The methodology then advances to 474. If the second interval has not elapsed at 468, the methodology advances directly to 474. At 474, the transceiver module resumes a low power mode. The methodology then returns to 452 to await user input or an incoming message.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, we claim the following:

1. A portable computer assembly, comprising:
a global positioning system module that produces location information associated with the position of the portable computer assembly;
an L-band transceiver that broadcasts the location information to a satellite relay and receives location information from at least one portable communications device via the satellite relay;
a processing unit that provides messages to the L-band transceiver and updates a display associated with the portable computer assembly according the received location information and the location information produced at the global positioning system module; and
a Faraday cage that encloses the L-band transceiver and the global positioning system module to reduce electromagnetic interference with the L-band transceiver and the global positioning module, the Faraday cage comprising a back plate of the processing unit that forms one wall of the Faraday cage and a metallic enclosure that encloses the L-band transceiver and the global positioning system module and being configured as a heat sink to draw heat from the L-band transceiver away from the processing unit, the Faraday cage being mounted to a back of the processing unit.

2. The portable computer assembly of claim 1, the processing unit comprising a system memory that contains geographic information concerning an area of interest.

3. The portable computer assembly of claim 2, the system memory comprising at least one flash memory card.

4. The portable computer assembly of claim 1, further comprising an input/output board that regulates power and logic connections between the processing unit and the L-band transceiver.

5. The portable computer assembly of claim 1, the display associated with the processing unit being a touchscreen display.

6. The portable computer assembly of claim 1, further comprising a single, detachable antenna that can be operatively connected to the portable computer assembly by a user to facilitate the transmission and reception of messages by the L-band transceiver and reception of data at the global positioning module.

7. The portable computer assembly of claim 6, the antenna comprising a quadrifilar helix antenna.

8. The portable computer assembly of claim 1, wherein the back plate includes at least one opening to admit one or more data communication connections and a power supply cable between a digital board and the processing unit, the digital board residing in the Faraday cage and having control circuitry for controlling the L-band transceiver and the global positioning system module.

9. The portable computer assembly of claim 1, wherein the L-band transceiver comprises a plurality of discrete components, and the Faraday cage comprises metal shielding within the metallic enclosure to reduce electromagnetic interference between the plurality of discrete components within the Faraday cage.

10. A portable communications system, comprising:
a global positioning system module that produces location information associated with the position of the portable communications assembly;
a transceiver that broadcasts the location information directly to a satellite relay and receives location information from at least one portable communications device via the satellite relay;
a computer, operatively connected to the transceiver and the global positioning module through at least one aperture in a back plate of the computer, that provides messages to the transceiver and updates a display associated with the computer assembly according the received location information and the location information produced at the global positioning system module; and
a Faraday cage that encloses the transceiver and the global positioning system module to reduce electromagnetic interference, the Faraday cage comprising the back plate of the computer that forms one wall of the Faraday cage and a metallic enclosure that encloses the transceiver and the global positioning system module and forms a back of the computer, the Faraday cage being configured as a heat sink to draw heat from the L-band transceiver away from the computer.

11. The portable communications system of claim 10, further comprising an antenna operatively connected to the transceiver and the global positioning module that facilitates the transmission and reception of messages by the transceiver and reception of data at the global positioning module.

12. The portable communications system of claim 10, wherein the antenna comprises a detachable quadrifilar helix antenna.

13. The portable communications system of claim 10, wherein the transceiver comprises an L-band transceiver.

14. The portable communications system of claim 13, wherein the transceiver comprises a plurality of discrete components, and the Faraday cage comprises metal shielding within the metallic enclosure to reduce electromagnetic interference between the plurality of discrete components within the Faraday cage.

15. A portable computer assembly, comprising:
a global positioning system module that produces location information associated with the position of the portable computer assembly;
an L-band transceiver that broadcasts the location information to a satellite relay and receives location information from at least one portable communications device via the satellite relay;
a processing unit that provides messages to the L-band transceiver and updates a display associated with the portable computer assembly according the received location information and the location information produced at the global positioning system module;
a Faraday cage that encloses the L-band transceiver to reduce electromagnetic interference, the Faraday cage comprising a metallic enclosure that encloses the L-band transceiver, with a back plate of the processing unit forming one wall of the metallic enclosure and the Faraday cage being configured as a heat sink to draw heat from the L-band transceiver away from the processing unit; and
a single, detachable antenna operatively connected to the L-band transceiver and the global positioning module that facilitates the transmission and reception of messages by the L-band transceiver and reception of data at the global positioning module.

16. The portable computer assembly of claim 15, the antenna comprising a detachable quadrifilar helix antenna.

17. The portable computer assembly of claim 15, wherein the L-band transceiver comprises a plurality of discrete components, and the Faraday cage comprises metal shielding within the metallic enclosure to reduce electromagnetic interference between the plurality of discrete components within the Faraday cage.

* * * * *